United States Patent
Rahman

(10) Patent No.: US 12,432,006 B2
(45) Date of Patent: Sep. 30, 2025

(54) DYNAMIC OFDMA TYPE SELECTION

(71) Applicant: T-Mobile USA, Inc., Bellevue, WA (US)

(72) Inventor: Muhammad Tawhidur Rahman, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 725 days.

(21) Appl. No.: 17/747,864

(22) Filed: May 18, 2022

(65) Prior Publication Data

US 2023/0379077 A1    Nov. 23, 2023

(51) Int. Cl.
*H04L 1/00*      (2006.01)
*H04L 5/00*      (2006.01)
*H04L 27/26*     (2006.01)
*H04W 72/542*    (2023.01)

(52) U.S. Cl.
CPC .......... *H04L 1/0003* (2013.01); *H04L 5/0007* (2013.01); *H04L 27/2627* (2013.01); *H04W 72/542* (2023.01)

(58) Field of Classification Search
CPC . H04L 27/2636; H04L 5/0023; H04L 1/0003; H04L 5/0007
See application file for complete search history.

(56) References Cited

U.S. PATENT DOCUMENTS

| | | | |
|---|---|---|---|
| 8,155,701 B2* | 4/2012 | Balachandran | H04L 27/0008 370/344 |
| 9,210,023 B1* | 12/2015 | Nagaraja | H04L 5/0098 |
| 2011/0058470 A1* | 3/2011 | Chang | H04L 27/2647 370/208 |
| 2015/0049716 A1* | 2/2015 | Gutierrez | H04B 7/0413 370/329 |
| 2016/0050094 A1* | 2/2016 | Ryu | H04L 27/2697 370/329 |
| 2018/0054848 A1* | 2/2018 | Yoo | H04W 72/23 |
| 2020/0033442 A1* | 1/2020 | Gulati | H04K 1/00 |
| 2022/0046486 A1* | 2/2022 | Shrestha | H04W 36/0009 |
| 2022/0312486 A1* | 9/2022 | Zhang | H04W 74/006 |

* cited by examiner

Primary Examiner — Romani Ohri
(74) Attorney, Agent, or Firm — Foley IP Law, PLLC

(57) ABSTRACT

Solutions for dynamic orthogonal frequency division multiple access (OFDMA) type selection include: determining, by the wireless network, a propagation delay between a user equipment (UE) and a base station of the wireless network that is serving the UE over an air interface; based on at least the propagation delay exceeding a first threshold, instructing, by the wireless network, the UE to use a first OFDMA type (e.g., direct Fourier transform spread orthogonal frequency division multiplexing DFTS-OFDM)) for the air interface; based on at least the propagation delay falling below a second threshold, instructing, by the wireless network, the UE to use a second OFDMA type (e.g., cyclic prefix OFDM), wherein the second threshold is no greater than the first threshold, and wherein the second OFDMA type is different than the first OFDMA type for the air interface; and providing, by the wireless network, the data traffic session for the UE.

17 Claims, 6 Drawing Sheets

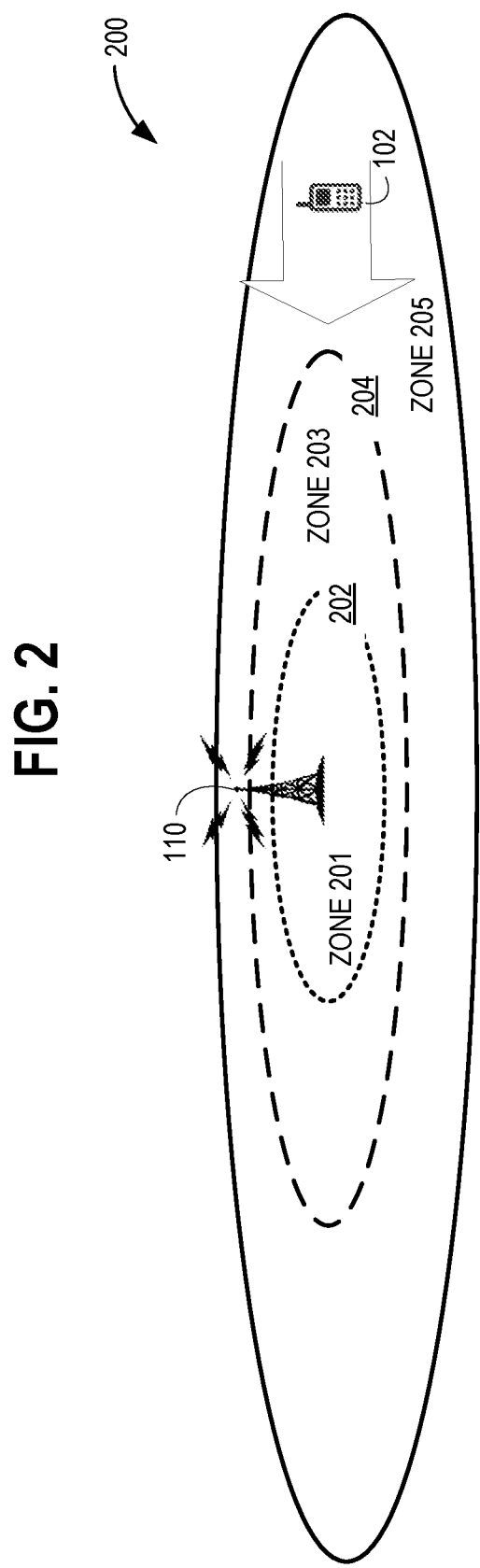

DYNAMIC OFDMA TYPE SELECTION

BACKGROUND

When a cellular device, such as a user equipment (UE), connects to a cellular network, such as a fourth generation (4G) or fifth generation (5G) cellular network, the serving base station may instruct the UE to use a particular type of modulation. Cellular networks typically use orthogonal frequency division multiple access (OFDMA), for example, direct Fourier transform spread orthogonal frequency division multiplexing (DFTS-OFDM) is common for 4G and cyclic prefix orthogonal frequency division multiplexing (CP-OFDM) is common for 5G.

In general, for a given operating frequency band, CP-OFDM is more spectrally efficient than DFTS-OFDM when the distance between the UE and the serving base station is relatively short, but CP-OFDM suffers from poorer performance at long ranges, in comparison with DFTS-OFDM. Thus, given a particular operating frequency, some wireless networks have a fixed trade-off of more spectrally efficiency at close ranges, at the cost of poor long-range performance, while other wireless networks have a fixed trade-off of superior long-range performance at the cost of lower spectral efficiency at close ranges.

SUMMARY

The following summary is provided to illustrate examples disclosed herein, but is not meant to limit all examples to any particular configuration or sequence of operations.

Solutions for providing dynamic orthogonal frequency division multiple access (OFDMA) type selection include: determining, by the wireless network, a propagation delay between a user equipment (UE) and a base station of the wireless network that is serving the UE over an air interface; based on at least the propagation delay exceeding a first threshold, instructing, by the wireless network, the UE to use a first OFDMA type (e.g., direct Fourier transform spread orthogonal frequency division multiplexing, DFTS-OFDM) for the air interface; based on at least the propagation delay falling below a second threshold, instructing, by the wireless network, the UE to use a second OFDMA type (e.g., cyclic prefix orthogonal frequency division multiplexing, CP-OFDM), wherein the second threshold is no greater than the first threshold, and wherein the second OFDMA type is different than the first OFDMA type for the air interface; and providing, by the wireless network, the data traffic session for the UE.

BRIEF DESCRIPTION OF THE DRAWINGS

The disclosed examples are described below with reference to the accompanying drawing figures listed below, wherein:

FIG. 2 illustrates various geometry parameters relevant to examples of the arrangement of FIG. 1;

Figure 1:
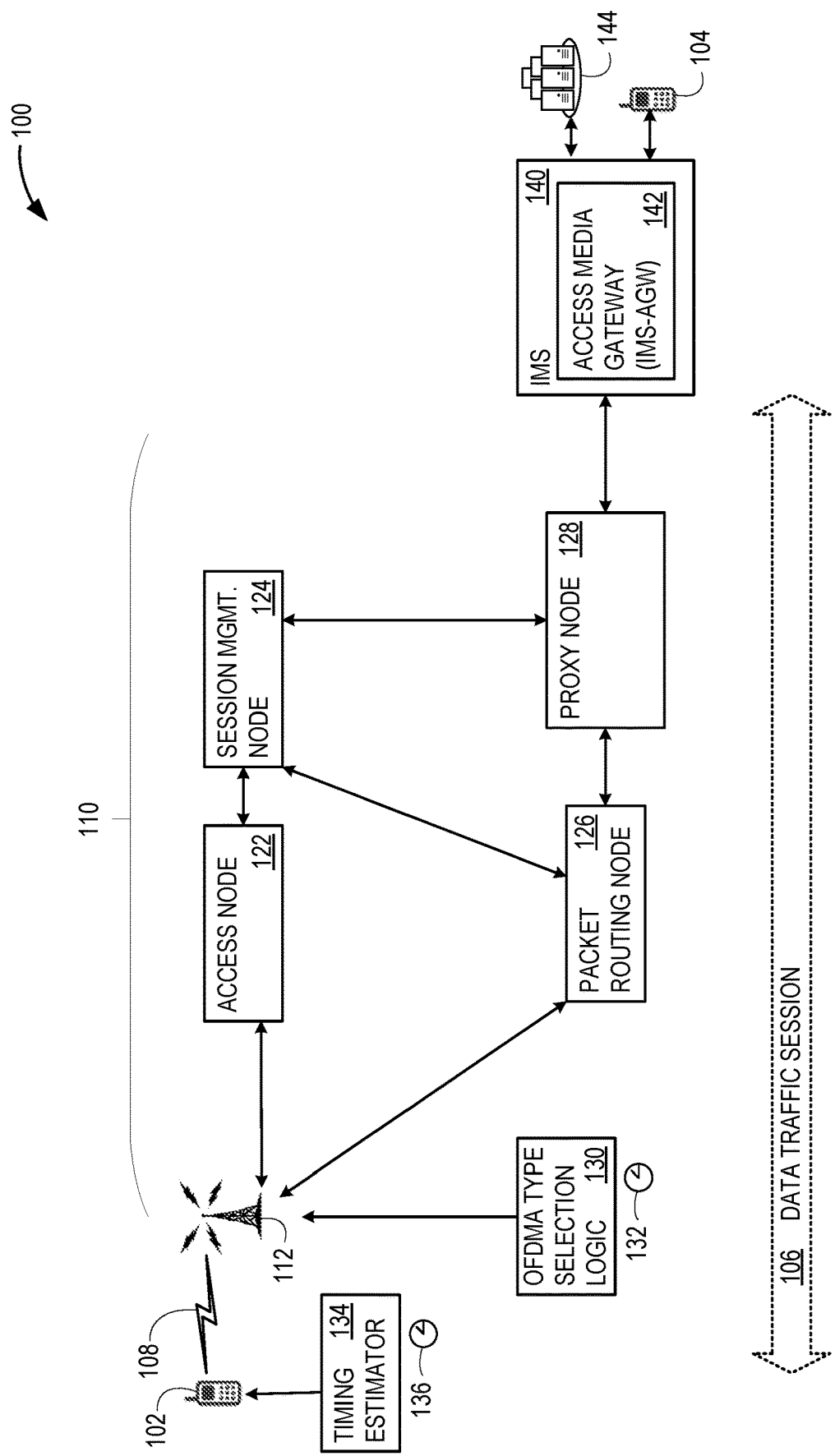
FIG. 1 illustrates an exemplary arrangement that advantageously provides dynamic orthogonal frequency division multiple access (OFDMA) type selection.

Corresponding reference characters indicate corresponding parts throughout the drawings, where practical. References made throughout this disclosure. relating to specific examples, are provided for illustrative purposes, and are not meant to limit all implementations or to be interpreted as excluding the existence of additional implementations that also incorporate the recited features.

DETAILED DESCRIPTION

Solutions for providing dynamic orthogonal frequency division multiple access (OFDMA) type selection include: determining, by the wireless network, a propagation delay between a user equipment (UE) and a base station of the wireless network that is serving the UE over an air interface; based on at least the propagation delay exceeding a first threshold, instructing, by the wireless network, the UE to use a first OFDMA type (e.g., direct Fourier transform spread orthogonal frequency division multiplexing, DFTS-OFDM) for the air interface; based on at least the propagation delay falling below a second threshold, instructing, by the wireless network, the UE to use a second OFDMA type (e.g., cyclic prefix orthogonal frequency division multiplexing, CP-OFDM), wherein the second threshold is no greater than the first threshold, and wherein the second OFDMA type is different than the first OFDMA type for the air interface; and providing, by the wireless network, the data traffic session for the UE.

Aspects of the disclosure improve the efficiency of cellular communications by selecting an OFDMA type that is more optimal for a distance between the UE and the base station, for example, CP-OFDM to improve spectral efficiency (increasing data throughput) for shorter distances, and DFTS-OFDM to improve reliability for longer distance. This is enabled, at least in part, by determining a propagation delay between the UE and the base station of the wireless network that is serving the UE over the air interface. Because the propagation delay is largely determined by (e.g., proportional to) the distance, determining the propagation delay is equivalent to determining the distance between the UE and the base station.

Whereas, previously, wireless networks were saddled with a fixed trade-off, the dynamic OFDMA type selection disclosed herein permits changing the OFDMA type to take advantage of the relative advantages of each type. Thus, aspects of the disclosure are able to improve the efficiency of cellular communications by improving the data throughput, either by improving spectral efficiency or signal reliability, based on the UE's distance from the base station distance.

With reference now to the figures, FIG. 1 illustrates an arrangement 100 that advantageously provides dynamic OFDMA type selection. In arrangement 100, a wireless network 110 provides a data traffic session 106 for UE 102, for example a voice call with another UE 104 or a data packet session with a packet data network 144. UE 102 communicates with a base station 112 of wireless network 110 using an air interface 108. Signaling for setting up data traffic session 106 passes from base station 112 through an access node 122 to a session management node 124. Data packets of data traffic session 106 pass from base station 112 through a packet routing node 126 and a proxy node 128 to an internet protocol (IP) multimedia system (IMS) 140, which has an IMA access media gateway (IMS-AGW) 142. Further networks connect IMS-AGW 142 to UE 104 and/or packet data network 144.

In some examples, wireless network 110 may comprise a fourth generation (4G) cellular network, a fifth generation 5G cellular network, or another wireless network, such as a WiFi network. For a 4G wireless network 110, base station 112 may comprise an eNodeB (eNB), access node 122 may comprise a mobility management entity (MME), session management node 124 may comprise a packet data network gateway (PGW) control plane function (PGW-C) and a serving gateway (SGW) control plane function (SGW-C), and packet routing node 126 may comprise a PGW user plane function (PGW-U) and an SGW user plane function (SGW-U). For a 5G wireless network 110, base station 112 may comprise a gNodeB (gNB), access node 122 may comprise an access and mobility management function (AMF), session management node 124 may comprise a session management function (SMF), and packet routing node 126 may comprise a user plane function (UPF). In some examples, proxy node 128 comprises a proxy-call session control function (P-CSCF).

Cellular and WiFi networks may use OFDMA, which relies on a timing advance to adjust uplink frame timing relative to downlink frame timing, in order to compensate for propagation delay resulting from the distance between a UE and a base station. Third Generation Partnership Project (3GPP) technical standard TS 38.300, which has an equivalent European Telecommunications Standard Institute (ETSI) technical standard TS 138.300, sets forth procedures for determining the timing advance needed, for example in sections 5.1 ("Waveform, numerology and frame structure"), 5.3.5.3 ("Uplink timing control"), 9.2.9 ("Timing Advance"), an others. To support UE 102 determining its timing alignment portion (e.g., the result reported to base station 112), UE 102 has a timing estimator 134 and a timer 136. To support base station 112 determining the final timing alignment values, base station 112 has a timer 132. Base station 112 also has an OFDMA type selection logic 130 to perform dynamic OFDMA type selection, as described at least in relation to a flowchart 400 of FIG. 4.

FIG. 2 illustrates various geometry parameters relevant to examples of arrangement 100. A cell 200 for base station 112 is divided into three distance zones: zone 201 (closest to base station 112), zone 203, and zone 205 (furthest from base station 112). A distance threshold 202 separates zone 201 from zone 203, and a distance threshold 204 separates zone 203 from zone 205. When within zone 205, UE 102 will use a first OFDMA type for superior long range performance, such as DFTS-OFDM. When within zone 201, UE 102 will use a second OFDMA type for superior spectral efficiency, such as CP-OFDM. When within zone 203, UE 102 will use the first or second OFDMA type, based on a power measurement 356 (see FIG. 3B). In some examples, distance threshold 202 is equal to distance threshold 204, and there is no zone 203. As illustrated in FIG. 2, UE 102 is within zone 205, moving toward base station 112.

Figure 3A:
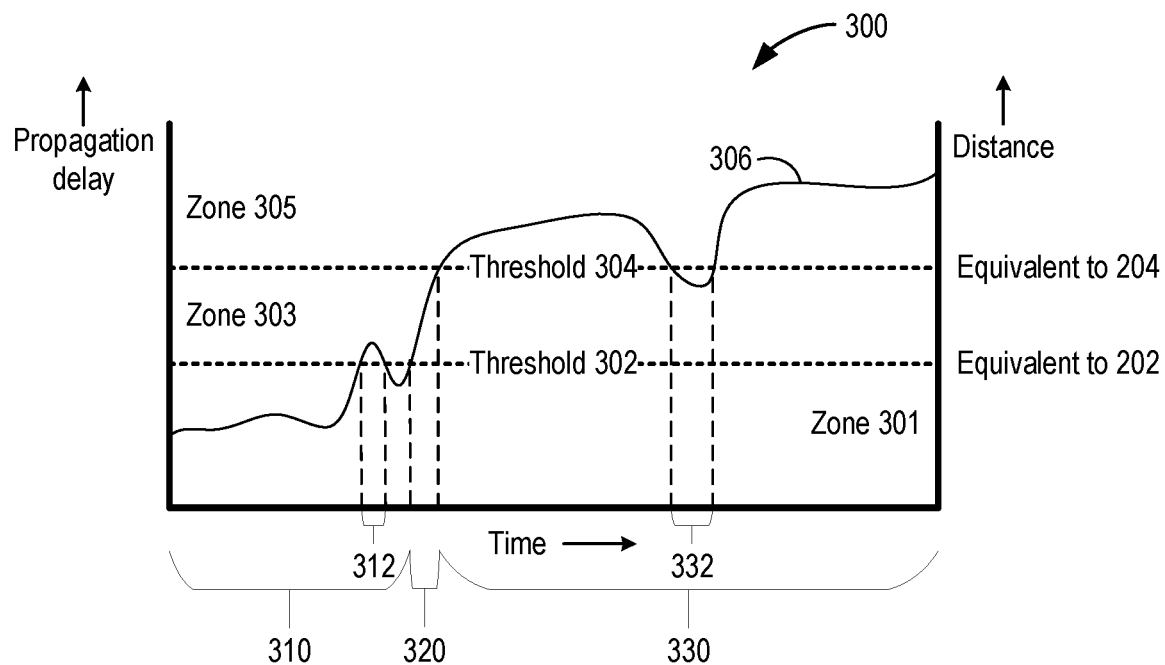
FIGS. 3A and 3B illustrate various thresholds used by examples of the arrangement of FIG. 1.
Figure 3B:
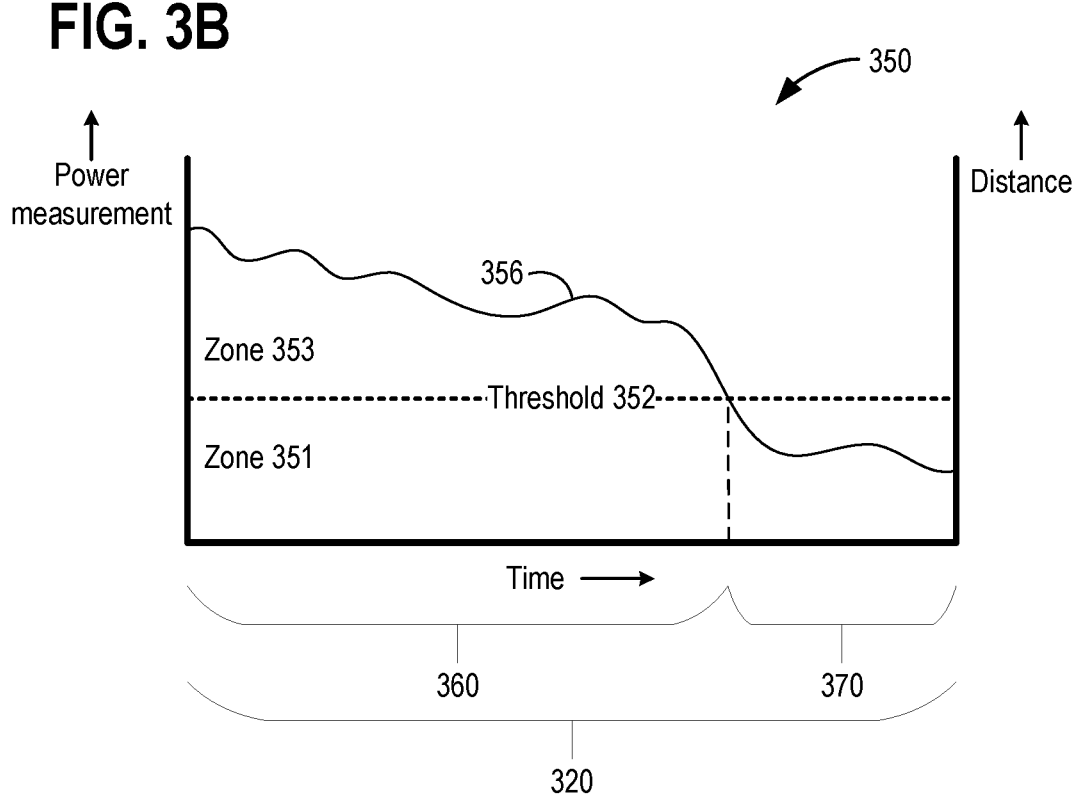

FIGS. 3A and 3B illustrate various thresholds used by examples of arrangement 100. A graph 300 plots propagation delay 306 between UE 102 and base station 112 as a function of time. Two propagation delay thresholds: threshold 302 and threshold 304 are equivalent to distance thresholds 202 and 203, respectively, due to the propagation rate of wireless signals. The two thresholds 302 and 304 create three propagation delay zones: zone 301, zone 303, and zone 305. In some examples, threshold 302 is equal to threshold 304, and there is no zone 303. As illustrated in FIG. 3A, propagation delay 306 crosses thresholds 302 and 304, traversing from zone 301, through zone 303, and into zone 305.

During a time period 310, UE 102 is using the second OFDMA type, due to propagation delay 306 being below threshold 302 (i.e., UE 102 is closer to base station 112 than distance threshold 202). During time period 310, there is a brief time period 312, in which propagation delay 306 exceeds threshold 302, and then returns to being below threshold 302. In some examples, a delay is enforced, to create a hysteresis situation, to prevent UE 102 from rapidly oscillating between two different OFDMA types.

During a time period 320, UE 102 is using an OFDMA type determined by a power measurement, as shown in FIG. 3B. Continuing with the description of FIG. 3A, during a time period 330, UE 102 is using the first OFDMA type, due to propagation delay 306 exceeding threshold 304 (i.e., UE 102 is further from base station 112 than distance threshold 204). During time period 330, there is a brief time period 332, in which propagation delay 306 is below threshold 304, and then returns to exceeding threshold 304. In some examples, a delay is enforced, to create a hysteresis situation, to prevent UE 102 from rapidly oscillating between two different OFDMA types.

Time period 320 is illustrated in finer detail in FIG. 3B. A graph 350 plots power measurement 356 for UE 102 as a function of time. Power measurement 356 may be a signal to interference and noise ratio (SINR), a peak to average power ratio (PAPR), a received signal strength indicator (RSSI), a reference signal received power (RSRP), a reference signal received quality (RSRQ), a combination, or a different measurement. In some examples, power measurement 356 is a measurement of the uplink signal (UE 102 transmitting to base station 112). In some examples, a measurement of the downlink signal (base station 112 transmitting to UE 102) is used as a proxy for the uplink signal power.

A power threshold, threshold 352, creates two zones: zone 351 and zone 353. Time period 320 is separated into a time period 360 and a time period 370. When power measurement 356 exceeds threshold 352 (zone 353), as is shown for time period 360, UE 102 uses the second OFDMA type. When power measurement 356 falls below threshold 352 (zone 351), for longer than the hysteresis delay period, as is shown for time period 360, UE 102 uses the first OFDMA type.

Figure 4:
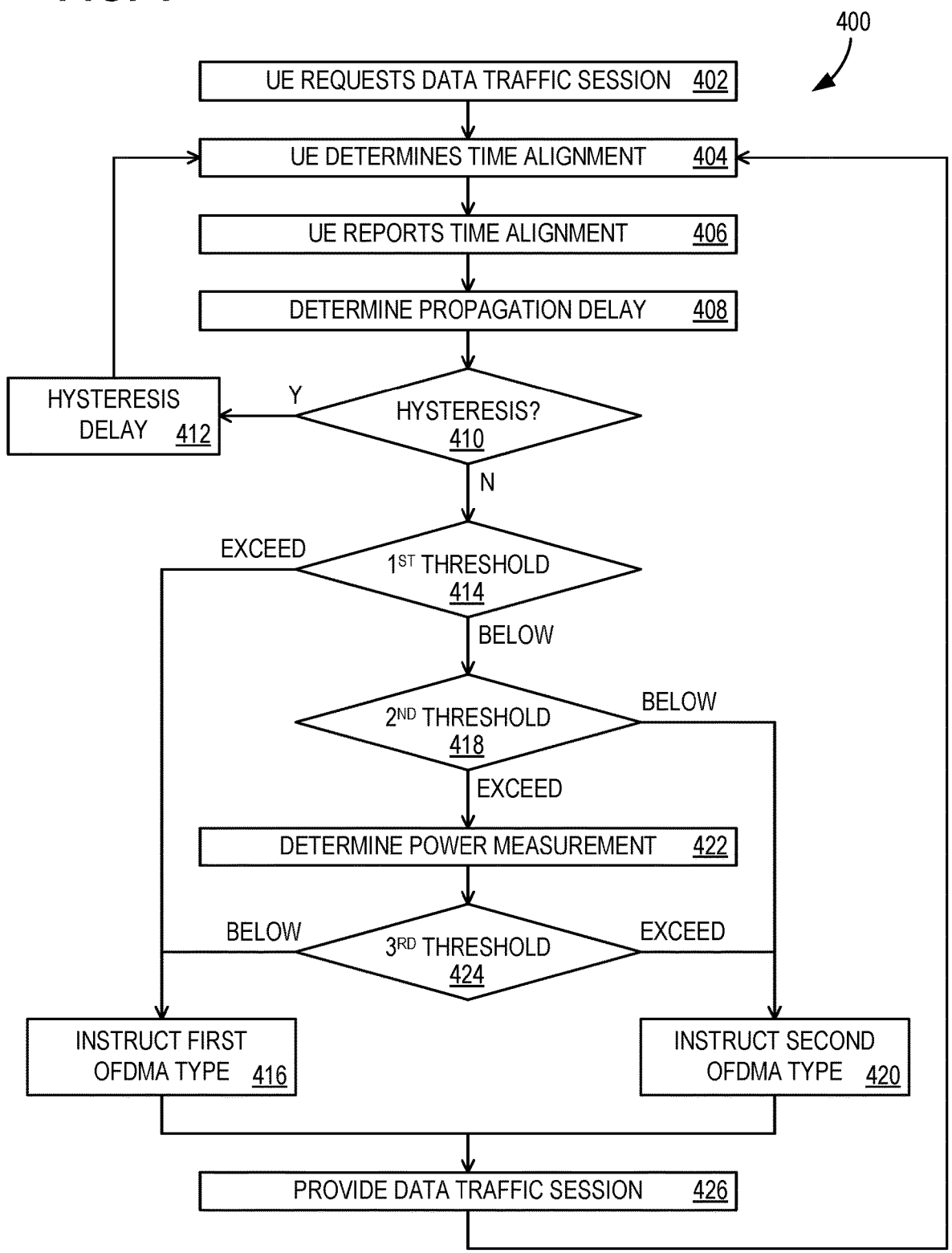
FIG. 4 illustrates a flowchart of exemplary operations associated with the arrangement of FIG. 1.

FIG. 4 illustrates a flowchart 400 of exemplary operations associated with providing data traffic session 106 for UE 102 using dynamic OFDMA type selection over wireless network 110. In some examples, at least a portion of flowchart 400 may be performed using one or more computing devices 600 of FIG. 6 (e.g., base station 112, access node 122, session management node 124, packet routing node 126, and proxy node 128 may use examples of computing device 600). In some examples, wireless network 110 comprises a 4G cellular network, a 5G cellular network, or a WiFi network. In some examples, data traffic session 106 comprises a voice session or a packet data session (other than a voice session).

Flowchart 400 commences with UE 102 requesting data traffic session 106 from wireless network 110, in operation 402. Operation 402 also includes receiving, by wireless network 110, a request to set up data traffic session 106 for UE 102. UE 102 determines its timing alignment in operation 404, using timer 136 and timing estimator 134. When a timing advance command is sent by base station 112 on the downlink of air interface 108, UE 102 may restart timer 136, which may be a time alignment timer (TAT). In operation 406, UE 102 reports its timing alignment estimate to base station 112. That is, operation 406 includes reporting, by UE 102, a timing estimate on a trigger condition, which may comprise a timer lapse (e.g., every three to five seconds).

In operation 408, wireless network 110 determines propagation delay 106 between UE 102 and base station 112 (of wireless network 110) that is serving UE 102 over air interface 108. In some examples, operations 404-408 are performed every three to five seconds. In some examples, base station 112 comprises an eNB for 4G cellular networks, a gNB for 5G cellular networks, or a WiFi router. In some examples, determining propagation delay 106 comprises estimating a distance, because with a known propagation rate for wireless signals, path length may be determined by propagation time. In some examples, determining propagation delay 106 comprises determining a timing alignment.

When flowchart 400 has been cycling through operations 404-426, and UE 102 is moving away from base station 112, operation 408 detects an increase in propagation delay 106 between UE 102 and base station 112. However, when UE 102 is moving toward base station 112, operation 408 detects a decrease in propagation delay 106 between UE 102 and base station 112.

When flowchart 400 has been cycling through operations 404-426, decision operation 410 determines whether a hysteresis delay is needed in order to prevent UE 102 from rapidly oscillating between two different OFDMA types. Decision operation 410 is skipped during the first pass through operation 408. If a hysteresis delay is needed, operation 412 runs down a countdown timer to delay instructing, by wireless network 110, a change in an OFDMA type to enforce a hysteresis condition. Flowchart 400 then returns to operation 404.

However, upon expiration of the countdown timer (or the first pass through operation 408), flowchart 400 moves to decision operation 414. Decision operation 414 determines whether propagation delay 106 exceeds threshold 304. If so, operation 416 includes, based on at least propagation delay 106 exceeding threshold 304, instructing, by wireless network 110, UE 102 to use the first OFDMA type for air interface 108 (e.g., the uplink of air interface 108). In some examples, the first OFDMA type comprises DFTS-OFDM. In some examples, threshold 304 is based on at least a frequency of the uplink of air interface 108, such as threshold 304 is higher for lower uplink frequencies and threshold 304 is lower for higher uplink frequencies. This is because higher frequencies tend to attenuate more quickly with distance.

An n41 5G band uses time-division duplexing (TDD) at 2500 megahertz (MHz), whereas an n71 5G band uses frequency-division duplexing (FDD) at 600 MHz. Thus, for a 5G wireless network 110, threshold 304 will be higher for an n71 band than for an n41 band. There are dozens of different bands among 4G and 5G, using various center frequencies, duplexing, and bandwidths, so multiple values may be used for threshold 304 across different examples of arrangement 100.

In some examples, threshold 304 is based on at least a location of base station 112, such as threshold 304 is higher for a rural location and threshold 304 is lower for an urban location. This is because signals transmitted by UE 102 tend to attenuate more quickly in crowded urban settings than in more open rural settings. Thus, multiple values may be used for threshold 304 across differently-located examples of arrangement 100. In some examples, instructing UE 102 comprises instructing UE 102 while UE 102 is in connected mode (e.g., data traffic session 106 is ongoing). In some examples, instructing UE 102 comprises instructing UE 102 while UE 102 is in idle mode (e.g., data traffic session 106 is not yet set up).

When UE 102 is using the second OFDMA type (e.g., set by a previous pass through flowchart 400) but is moving away from base station 112, such that propagation delay 306 crosses threshold 304, operation 416 includes, based on at least detecting the increase in propagation delay 106 between UE 102 and base station 112, instructing, by wireless network 110, UE 102 to use the first OFDMA type for air interface 108. Flowchart 400 then proceeds to operation 426, which is described below.

However, if decision operation 414 determines that propagation delay 106 is below threshold 304, decision operation 418 determines that propagation delay 106 is below threshold 302. If so, operation 420 includes, based on at least propagation delay 106 falling below threshold 302, instructing, by wireless network 110, UE 102 to use the second OFDMA type for air interface 108 (e.g., the uplink of air interface 108). The second OFDMA type is different than the first OFDMA type. In some examples, the second OFDMA type comprises CP-OFDM. Threshold 302 is no greater than threshold 304. In some examples, threshold 302 equals threshold 304, although in some examples, threshold 302 is less than threshold 304.

In some examples, threshold 302 is based on at least a frequency of an uplink of air interface 108. In some examples, threshold 302 is higher for lower uplink frequencies and threshold 302 is lower for higher uplink frequencies. In some examples, threshold 302 is based on at least a location of base station 112. In some examples, threshold 302 is higher for a rural location and threshold 302 is lower for an urban location.

When UE 102 is using the first OFDMA type (e.g., set by a previous pass through flowchart 400) but is moving toward base station 112, such that propagation delay 306 crosses threshold 302, operation 420 includes, based on at least detecting the decrease in propagation delay 106 between UE 102 and base station 112, instructing, by wireless network 110, UE 102 to use the second OFDMA type for air interface 108.

However, if decision operation 418 determines that propagation delay 106 is above threshold 304 (i.e., propagation delay 106 is between thresholds 302 and 304, in zone 303), flowchart 400 moves to operation 422. Operation 422 includes, based on at least propagation delay 106 falling below threshold 304 and exceeding threshold 302, determining power measurement 356 of UE 102. In some examples, power measurement 356 may be an SINR, a PAPR, an RSSI, an RSRP, or an RSRQ measurement.

Decision operation 424 determines whether power measurement 356 is above or below threshold 352. If below, flowchart 400 moves to operation 416, which now includes, based on at least power measurement 356 falling below threshold 352, instructing, by wireless network 110, UE 102 to use the first OFDMA type for air interface 108. If above, flowchart 400 moves to operation 420, which now includes, based on at least power measurement 356 exceeding threshold 352, instructing, by wireless network 110, UE 102 to use the second OFDMA type for air interface 108.

With the OFDMA type now instructed, flowchart 400 moves to operation 426, which includes providing, by wireless network 110, data traffic session 106 for UE 102. This involves receiving packet data, by base station 112, from UE 102, over air interface 108, and forwarding the received packet data, by base station 112, to IMS 150 and/or packet data network 144. Flowchart 400 then returns to operation 404.

Figure 5:
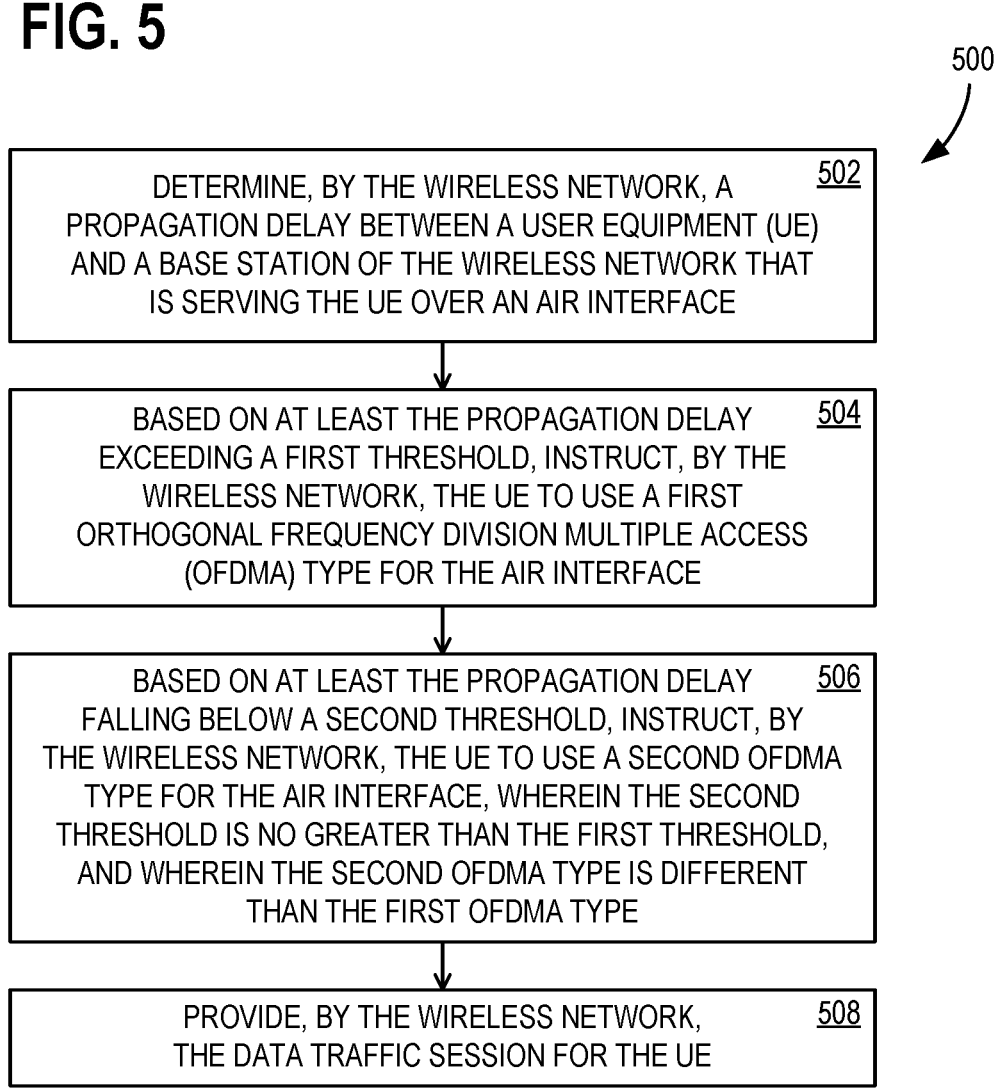
FIG. 5 illustrates another flowchart of exemplary operations associated with the arrangement of FIG. 1.

FIG. 5 illustrates a flowchart 500 of exemplary operations associated with examples of arrangement 100. In some examples, at least a portion of flowchart 500 may be performed using one or more computing devices 600 of FIG. 6. Flowchart 500 commences with operation 502, which includes determining, by the wireless network, a propagation delay between a UE and a base station of the wireless network that is serving the UE over an air interface.

Operation 504 includes, based on at least the propagation delay exceeding a first threshold, instructing, by the wireless network, the UE to use a first OFDMA type for the air interface. Operation 506 includes, based on at least the propagation delay falling below a second threshold, instructing, by the wireless network, the UE to use a second OFDMA type for the air interface, wherein the second threshold is no greater than the first threshold, and wherein the second OFDMA type is different than the first OFDMA type. Operation 508 includes providing, by the wireless network, the data traffic session for the UE.

Figure 6:
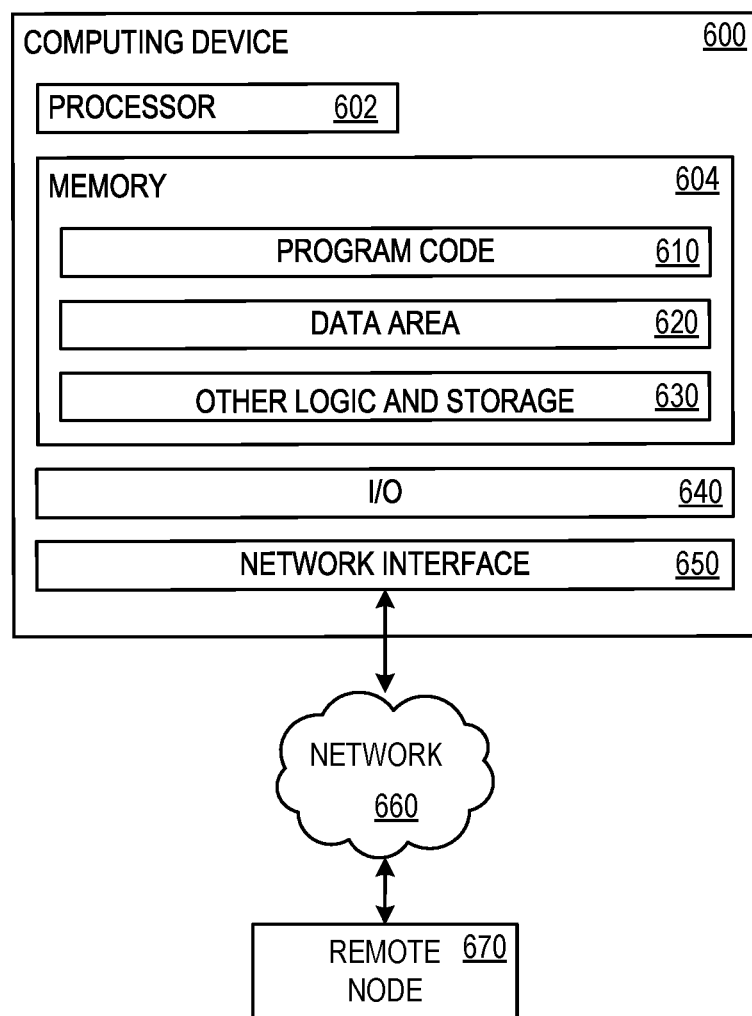
FIG. 6 illustrates a block diagram of a computing device suitable for implementing various aspects of the disclosure.

FIG. 6 illustrates a block diagram of computing device 600 that may be used as any component described herein that may require computational or storage capacity. Computing device 600 has at least a processor 602 and a memory 604 that holds program code 610, data area 620, and other logic and storage 630. Memory 604 is any device allowing information, such as computer executable instructions and/or other data, to be stored and retrieved. For example, memory 604 may include one or more random access memory (RAM) modules, flash memory modules, hard disks, solid-state disks, persistent memory devices, and/or optical disks. Program code 610 comprises computer executable instructions and computer executable components including any instructions necessary to perform operations described herein. Data area 620 holds any data necessary to perform operations described herein. Memory 604 also includes other logic and storage 630 that performs or facilitates other functions disclosed herein or otherwise required of computing device 600. An input/output (I/O) component 640 facilitates receiving input from users and other devices and generating displays for users and outputs for other devices. A network interface 650 permits communication over a network 660 with a remote node 670, which may represent another implementation of computing device 600. For example, a remote node 670 may represent another of the above-noted nodes within arrangement 100.

ADDITIONAL EXAMPLES

An example method of providing a data traffic session over a wireless network, the method comprising: determining, by the wireless network, a propagation delay between a UE and a base station of the wireless network that is serving the UE over an air interface; based on at least the propagation delay exceeding a first threshold, instructing, by the wireless network, the UE to use a first OFDMA type for the air interface; based on at least the propagation delay falling below a second threshold, instructing, by the wireless network, the UE to use a second OFDMA type for the air interface, wherein the second threshold is no greater than the first threshold, and wherein the second OFDMA type is different than the first OFDMA type; and providing, by the wireless network, the data traffic session for the UE.

An example system for providing a data traffic session over a wireless network, the system comprising: a processor; and a computer-readable medium storing instructions that are operative upon execution by the processor to: determine, by the wireless network, a propagation delay between a UE and a base station of the wireless network that is serving the UE over an air interface; based on at least the propagation delay exceeding a first threshold, instruct, by the wireless network, the UE to use a first OFDMA type for the air interface; based on at least the propagation delay falling below a second threshold, instruct, by the wireless network, the UE to use a second OFDMA type for the air interface, wherein the second threshold is no greater than the first threshold, and wherein the second OFDMA type is different than the first OFDMA type; and provide, by the wireless network, the data traffic session for the UE.

One or more example computer storage devices has computer-executable instructions stored thereon, which, upon execution by a computer, cause the computer to perform operations comprising: determining, by a wireless network, a propagation delay between a UE and a base station of the wireless network that is serving the UE over an air interface; based on at least the propagation delay exceeding a first threshold, instructing, by the wireless network, the UE to use a first OFDMA type for the air interface; based on at least the propagation delay falling below a second threshold, instructing, by the wireless network, the UE to use a second OFDMA type for the air interface, wherein the second threshold is no greater than the first threshold, and wherein the second OFDMA type is different than the first OFDMA type; and providing, by the wireless network, a data traffic session for the UE.

Alternatively, or in addition to the other examples described herein, examples include any combination of the following:
- the first OFDMA type comprises DFTS-OFDM;
- the second OFDMA type CP-OFDM;
- the second threshold is less than the first threshold;
- based on at least the propagation delay falling below the first threshold and exceeding the second threshold, determining a power measurement of the UE;
- based on at least the power measurement falling below a third threshold, instructing, by the wireless network, the UE to use the first OFDMA type for the air interface;
- based on at least the power measurement exceeding the third threshold, instructing, by the wireless network, the UE to use the second OFDMA type for the air interface;
- the first threshold is based on at least a frequency of an uplink of the air interface;
- the second threshold is based on at least a frequency of an uplink of the air interface;
- the first threshold is based on at least a location of the base station;
- the second threshold is based on at least a location of the base station;
- determining the propagation delay comprises determining a timing alignment;
- detecting an increase in the propagation delay between the UE and the base station;
- based on at least detecting the increase in the propagation delay between the UE and the base station, instructing, by the wireless network, the UE to use the first OFDMA type for the air interface;
- detecting a decrease in the propagation delay between the UE and the base station;
- based on at least detecting the decrease in the propagation delay between the UE and the base station, instructing, by the wireless network, the UE to use the second OFDMA type for the air interface;
the data traffic session comprises a voice session;
the data traffic session comprises a packet data session;
the data traffic session comprises a voice session;
the wireless network comprises a 4G wireless network;
the base station comprises an eNB;
the wireless network comprises a 5G wireless network;
the base station comprises a gNB;
the wireless network comprises a WiFi wireless network;
the base station comprises a WiFi router;
receiving, by the wireless network, a request to set up the data traffic session for the UE;
determining the propagation delay comprises estimating a distance;
instructing, by the wireless network, the UE to use the first OFDMA type for an uplink of the air interface;
instructing, by the wireless network, the UE to use the second OFDMA type for the uplink of the air interface;
the second threshold equals the first threshold;
the first threshold is higher for lower uplink frequencies and the first threshold is lower for higher uplink frequencies;
the second threshold is higher for lower uplink frequencies and the second threshold is lower for higher uplink frequencies;
the first threshold is higher for a rural location and the first threshold is lower for an urban location;
the second threshold is higher for a rural location and the second threshold is lower for an urban location;
instructing the UE comprises instructing the UE while the UE is in connected mode;
instructing the UE comprises instructing the UE while the UE is in idle mode;
reporting, by the UE, a timing estimate on a trigger condition;
the trigger condition comprises a timer lapse;
receiving packet data, by the base station, from the UE, over the air interface;
forwarding the received packet data, by the base station, to a packet data network or an IMS; and
delaying instructing, by the wireless network, a change in an OFDMA type to enforce a hysteresis condition.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure. It will be understood that the benefits and advantages described above may relate to one embodiment or may relate to several embodiments. When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of."

Having described aspects of the disclosure in detail, it will be apparent that modifications and variations are possible without departing from the scope of aspects of the disclosure as defined in the appended claims. As various changes may be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A method of providing a data traffic session over a wireless network, the method comprising:
    determining, by the wireless network, a propagation delay between a user equipment (UE) and a base station of the wireless network that is serving the UE over an air interface;
    based on at least the propagation delay exceeding a first propagation delay threshold, instructing, by the wireless network, the UE to use a first orthogonal frequency division multiple access (OFDMA) type for the air interface;
    based on at least the propagation delay falling below a second propagation delay threshold, instructing, by the wireless network, the UE to use a second OFDMA type for the air interface, wherein the second propagation delay threshold is no greater than the first propagation delay threshold, and wherein the second OFDMA type is different than the first OFDMA type;
    based on the first propagation delay threshold being different from the second propagation delay threshold and the propagation delay falling below the first propagation delay threshold and exceeding the second propagation delay threshold, determining a power measurement of the UE;
    based on the power measurement falling below a power threshold, instructing, by the wireless network, the UE use the first OFDMA type for the air interface;
    based on the power measurement exceeding the power threshold, instructing, by the wireless network, the UE to use the second OFDMA type for the air interface; and
    providing, by the wireless network, the data traffic session for the UE, wherein the UE uses the first OFDMA type or the second OFDMA type as instructed by the wireless network.

2. The method of claim 1, wherein the first OFDMA type comprises direct Fourier transform spread orthogonal frequency division multiplexing (DFTS-OFDM), and wherein the second OFDMA type comprises cyclic prefix orthogonal frequency division multiplexing (CP-OFDM).

3. The method of claim 1, wherein the first propagation delay threshold and the second propagation delay threshold are each based on at least a frequency of an uplink of the air interface.

4. The method of claim 1, wherein the first propagation delay threshold and the second propagation delay threshold are each based on at least a location of the base station.

5. The method of claim 1, wherein determining the propagation delay comprises determining a timing alignment.

6. The method of claim 1, further comprising:
    detecting an increase in the propagation delay between the UE and the base station; and
    based on at least detecting the increase in the propagation delay between the UE and the base station, instructing, by the wireless network, the UE to use the first OFDMA type for the air interface.

7. A system for providing a data traffic session over a wireless network, the system comprising:
    a processor; and a non-transitory computer-readable medium storing instructions that are operative upon execution by the processor to:
- determine, by the wireless network, a propagation delay between a user equipment (UE) and a base station of the wireless network that is serving the UE over an air interface;
- based on at least the propagation delay exceeding a first propagation delay threshold, instruct, by the wireless network, the UE to use a first orthogonal frequency division multiple access (OFDMA) type for the air interface;
- based on at least the propagation delay falling below a second propagation delay threshold, instruct, by the wireless network, the UE to use a second OFDMA type for the air interface, wherein the second propagation delay threshold is no greater than the first propagation delay threshold, and wherein the second OFDMA type is different than the first OFDMA type;
- based on the first propagation delay threshold being different from the second propagation delay threshold and the propagation delay falling below the first propagation delay threshold and exceeding the second propagation delay threshold, determine a power measurement of the UE;
- based on the power measurement falling below a power threshold, instruct, by the wireless network, the UE use the first OFDMA type for the air interface;
- based on the power measurement exceeding the power threshold, instruct, by the wireless network, the UE to use the second OFDMA type for the air interface; and
- provide, by the wireless network, the data traffic session for the UE, wherein the UE uses the first OFDMA type or the second OFDMA type as instructed by the wireless network.

8. The system of claim 7, wherein the first OFDMA type comprises direct Fourier transform spread orthogonal frequency division multiplexing (DFTS-OFDM), and wherein the second OFDMA type comprises cyclic prefix orthogonal frequency division multiplexing (CP-OFDM).

9. The system of claim 7, wherein the first propagation delay threshold and the second propagation delay threshold are each based on at least a frequency of an uplink of the air interface.

10. The system of claim 7, wherein the first propagation delay threshold and the second propagation delay threshold are each based on at least a location of the base station.

11. The system of claim 7, wherein determining the propagation delay comprises determining a timing alignment.

12. The system of claim 7, wherein the instructions are further operative to:
- detect a decrease in the propagation delay between the UE and the base station; and
- based on at least detecting the decrease in the propagation delay between the UE and the base station, instruct, by the wireless network, the UE to use the second OFDMA type for the air interface.

13. One or more computer storage devices having computer-executable instructions stored thereon, which, upon execution by a computer, cause the computer to perform operations comprising:
- determining, by a wireless network, a propagation delay between a user equipment (UE) and a base station of the wireless network that is serving the UE over an air interface;
- based on at least the propagation delay exceeding a first propagation delay threshold, instructing, by the wireless network, the UE to use a first orthogonal frequency division multiple access (OFDMA) type for the air interface;
- based on at least the propagation delay falling below a second propagation delay threshold, instructing, by the wireless network, the UE to use a second OFDMA type for the air interface, wherein the second propagation delay threshold is no greater than the first propagation delay threshold, and wherein the second OFDMA type is different than the first OFDMA type;
- based on the first propagation delay threshold being different from the second propagation delay threshold and the propagation delay falling below the first propagation delay threshold and exceeding the second propagation delay threshold, determining a power measurement of the UE;
- based on the power measurement falling below a power threshold, instructing, by the wireless network, the UE use the first OFDMA type for the air interface;
- based on the power measurement exceeding the power threshold, instructing, by the wireless network, the UE to use the second OFDMA type for the air interface; and
- providing, by the wireless network, a data traffic session for the UE, wherein the UE uses the first OFDMA type or the second OFDMA type as instructed by the wireless network.

14. The one or more computer storage devices of claim 13, wherein the first OFDMA type comprises direct Fourier transform spread orthogonal frequency division multiplexing (DFTS-OFDM), and wherein the second OFDMA type comprises cyclic prefix orthogonal frequency division multiplexing (CP-OFDM).

15. The one or more computer storage devices of claim 13, wherein the first propagation delay threshold and the second propagation delay threshold are each based on at least a frequency of an uplink of the air interface.

16. The one or more computer storage devices of claim 13, wherein the first propagation delay threshold and the second propagation delay threshold are each based on at least a location of the base station.

17. The one or more computer storage devices of claim 13, wherein determining the propagation delay comprises determining a timing alignment.

* * * * *